US008340971B1

(12) United States Patent
Abella et al.

(10) Patent No.: US 8,340,971 B1
(45) Date of Patent: Dec. 25, 2012

(54) SYSTEM AND METHOD OF DIALOG TRAJECTORY ANALYSIS

(75) Inventors: Alicia Abella, Morristown, NJ (US); Jeremy Huntley Wright, Berkeley Heights, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1110 days.

(21) Appl. No.: 11/029,320

(22) Filed: Jan. 5, 2005

(51) Int. Cl.
*G10L 21/00* (2006.01)

(52) U.S. Cl. ............... 704/270.1; 704/1; 704/9; 704/10; 704/270

(58) Field of Classification Search ............ 704/1, 9, 704/10, 270, 270.1; 379/265.01
See application file for complete search history.

(56) References Cited

U.S. PATENT DOCUMENTS

| | | | | |
|---|---|---|---|---|
| 6,138,087 A * | 10/2000 | Budzinski | | 704/9 |
| 6,356,869 B1 * | 3/2002 | Chapados et al. | | 704/275 |
| 6,418,440 B1 * | 7/2002 | Kuo et al. | | 707/10 |
| 6,567,805 B1 * | 5/2003 | Johnson et al. | | 707/5 |
| 6,904,143 B1 * | 6/2005 | Peterson et al. | | 379/265.01 |
| 7,013,279 B1 * | 3/2006 | Nelson | | 704/270 |
| 7,039,166 B1 * | 5/2006 | Peterson et al. | | 379/88.18 |
| 7,065,188 B1 * | 6/2006 | Mei et al. | | 379/88.23 |
| 7,092,928 B1 * | 8/2006 | Elad et al. | | 706/60 |
| 7,158,935 B1 * | 1/2007 | Gorin et al. | | 704/257 |
| 7,224,989 B2 * | 5/2007 | Kraft | | 455/466 |
| 7,251,595 B2 * | 7/2007 | Yasuda et al. | | 704/9 |
| 7,281,022 B2 * | 10/2007 | Gruhl et al. | | 707/104.1 |
| 7,292,976 B1 * | 11/2007 | Hakkani-Tur et al. | | 704/236 |
| 7,302,394 B1 * | 11/2007 | Baray et al. | | 704/257 |
| 7,305,336 B2 * | 12/2007 | Polanyi et al. | | 704/9 |
| 7,349,840 B2 * | 3/2008 | Budzinski | | 704/9 |
| 2002/0087310 A1 * | 7/2002 | Lee et al. | | 704/251 |
| 2002/0188441 A1 * | 12/2002 | Matheson et al. | | 704/202 |
| 2003/0115062 A1 * | 6/2003 | Walker et al. | | 704/258 |
| 2003/0212545 A1 * | 11/2003 | Kallulli | | 704/9 |
| 2004/0083092 A1 * | 4/2004 | Valles | | 704/9 |
| 2005/0036594 A1 * | 2/2005 | Hunter et al. | | 379/88.18 |
| 2005/0154591 A1 * | 7/2005 | Lecoeuche | | 704/270.1 |
| 2005/0182618 A1 * | 8/2005 | Azara et al. | | 704/9 |
| 2005/0234726 A1 * | 10/2005 | Torge et al. | | 704/270.1 |

OTHER PUBLICATIONS

Constantinides, P. et al., "Dialog Analysis in the Carnegie Mellon Communicator," 6th European Conf. on Speech Communication and Technology, Sep. 1999.*

* cited by examiner

*Primary Examiner* — Douglas Godbold

(57) ABSTRACT

The invention comprises computer-readable media, methods and systems for performing a dialog analysis and using that analysis to release an updated spoken dialog system. The method embodiment of the invention comprises receiving data associated with dialogs, extracting turn by turn details of the dialog and generating from the extracted details an empirical call-flow representation of the dialog. The call data may be call-logs and user audio. The empirical call-flow representation may be a finite-state machine with nodes that represent call-states and the arcs between nodes represent user responses. Nodes may also represent sub-dialogs. The call-flow representation is presented graphically to a user for easier analysis and understanding. Significant changes in the dialog can be identified as hot-spots for improvement in the next release of the spoken dialog system.

30 Claims, 8 Drawing Sheets

US 8,340,971 B1

SYSTEM AND METHOD OF DIALOG TRAJECTORY ANALYSIS

BACKGROUND OF THE INVENTION

1. Field of the Invention

The present invention relates to spoken dialog systems and more specifically to a system and method of using a dialog trajectory analysis to provide feedback to automatically detect problems and implement improvements.

2. Introduction

The present invention relates generally to spoken dialog systems. FIG. 1 illustrates a block diagram of the basic components of a spoken dialog system. Natural language spoken dialog system 100 may include an automatic speech recognition (ASR) module 102, a spoken language understanding (SLU) module 104, a dialog management (DM) module 106, a spoken language generation (SLG) module 108, and a text-to-speech (TTS) module 110. ASR module 102 may analyze speech input and may provide a transcription of the speech input as output. SLU module 104 may receive the transcribed input and may use a natural language understanding model to analyze the group of words that are included in the transcribed input to derive a meaning from the input. DM module 106 may receive the meaning of the speech input as input and may determine an action, such as, for example, providing a spoken response, based on the input. SLG module 108 may generate a transcription of one or more words in response to the action provided by DM 106. ITS module 110 may receive the transcription as input and may provide generated audible speech as output based on the transcribed speech.

Thus, the modules of system 100 may recognize speech input, such as speech utterances, may transcribe the speech input, may identify (or understand) the meaning of the transcribed speech, may determine an appropriate response to the speech input, may generate text of the appropriate response and from that text, generate audible "speech" from system 100, which the user then hears. In this manner, the user can carry on a natural language dialog with system 100. Those of ordinary skill in the art will understand the programming languages and means for generating and training ASR module 102 or any of the other modules in the spoken dialog system. Further, the modules of system 100 may operate independent of a full dialog system. For example, a computing device such as a smartphone (or any processing device having a phone capability) may have an ASR module wherein a user may say "call mom" and the smartphone may act on the instruction without a "spoken dialog." Therefore, a spoken dialog "system" may include one or more of the modules to carry out the necessary functions for the particular application that uses speech technologies.

Dialog systems exist in a variety of instantiations, each allowing the user a different interaction medium. Touch-tone dialog systems exist that accept only keypad input, requiring a user to select from a predefined set of options that may or may not reflect the user's problem. Directed dialog systems also exist that allow speech input but greatly constrain what the user can say. Quite often these systems do not differ greatly from traditional touch-tone systems. The most flexible of dialog systems enable user initiative, allowing the user to describe their problem in unconstrained fluent speech, shifting the burden from the user to the system. See, e.g., A. L. Gorin, G. Riccardi and J. H. Wright, "How May I Help You?", Speech Communication, 23: 113-127, 1997; and A. L. Gorin, A. Abella, T. Alonso, G. Riccardi and J. H. Wright, "Automated natural spoken dialog", IEEE Computer Magazine, 35(4):51-56, 2002, both incorporated herein by reference. A method for monitoring the user-system interaction is required regardless of the type of dialog system.

There are two traditional ways to monitor deployed spoken dialog systems. First, call monitoring enables operations personnel to dial in and listen to a series of calls made to the system. This has the advantage that the listeners can hear the customers' speech and assess the experience from the customers' viewpoint. However, the sample of calls is bound to be very small, it may be unrepresentative because of the timing of dial-in sessions, and the listeners' assessments will be subjective. Second, summary reports are normally available on a daily or weekly basis. Typically these give a breakdown of the overall outcomes of all the calls into the system, including the numbers of service completions, transfers to agents, and hang-ups. But they are usually too coarse-grained to be of diagnostic value when some parts of the system are not performing well. The same is true of the usability measures widely used for spoken dialog systems.

Therefore, the small-sample and subjective call-monitoring and the summary reports that are too coarsely grained to be of diagnostic value provide little real data on the efficiency and productivity of the dialog system.

What is needed in the art is an improved method of obtaining feedback on how well a spoken dialog system is operating and using that feedback to improve the performance of the system.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The invention comprises computer-readable media, methods and systems for performing a dialog analysis and using that analysis to release an updated spoken dialog system. The solution of the present invention enables a more fine-grained analysis and diagnosis of a spoken dialog system. This enables an administrator to more effectively and quickly upgrade or generate a new release of the system that will be directed towards specific parts of a dialog where the system is not working as well as it should. The improvements of the present invention provide for more informed decisions on changes to deployed dialog systems and lead to improved quality of service, fewer transfers to human agents, fewer customer complaints and fewer service cancellations.

The method embodiment of the invention comprises receiving data associated with dialogs, extracting turn by turn details of the dialog and generating from the extracted details an empirical call-flow representation of the dialog. The empirical call-flow representation may be a finite-state machine with nodes that represent call-states and the arcs between nodes represent user responses. Nodes may also represent sub-dialogs. The call-flow representation is presented graphically to a user for easier analysis and understanding. Poorly functioning parts of the spoken dialog system can be investigated in detail and improvements planned for the next release of the system. Significant changes from one release to the next can be highlighted graphically.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
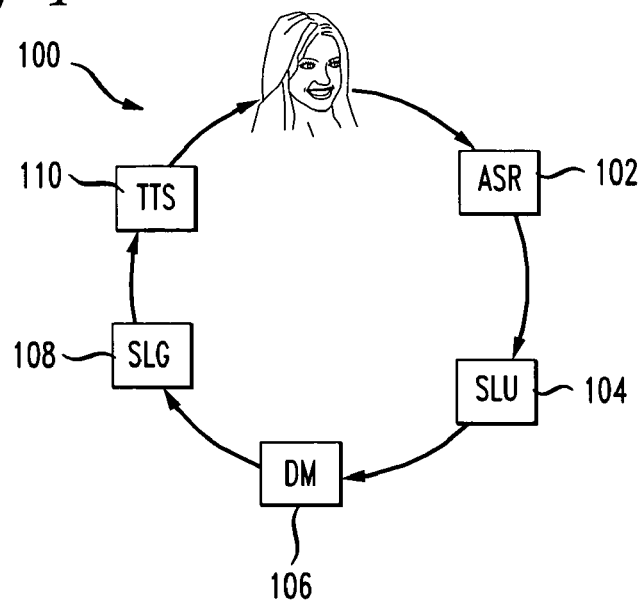
FIG. 1 illustrates a block diagram of a typically spoken dialog system.

Spoken dialog systems are becoming increasingly common in deployed services. The physical configuration of these systems typically involves a computing device having the basic known components such as a computer processor, bus system, memory, data storage, and communication means, that performs the speech processing referenced in FIG. 1. A microphone and speaker are components of a full dialog system for the purposes of receiving user speech and presenting system-generated audio representing the response heard by the user. These systems are not perfect, and are often deployed "open-loop", which means that they lack in systematic procedures for diagnosing problems and for making improvements. In order to target improvements where they will have the biggest impact, two things are needed: first, methods and tools for detailed analysis of a data feed of data associated with dialogs such as call logs and customer audio; second, an interactive tool for presenting an intuitive view of the results to those responsible for the application. The present invention provides an implementation through which the loop may be closed between system execution and system evolution by providing an empirical dialog trajectory analysis represented via a representation of the data such as, for example, a stochastic finite state machine. Novel graph analysis algorithms are introduced for change detection, compression and pruning for display, based on user-interface objectives An aspect of the invention includes new ideas for automatically analyzing all calls, providing fine-grained analysis and diagnosis, real-time system evaluation and business intelligence. At the core of this technology is an algorithm for creating an empirical call-flow that enables the analysis and evaluation of the system with respect to the call-flow specification. The call-flow specifies the actions the application should perform based on the user input and possibly pertinent external information about the user that is retrieved from a database. The call flow is organized into sub-dialogs, each of which may involve a series of turns with the user. A turn is simply the pair of events comprising a query from the system (such as "How may I help you?") and the user response (such as "I need an account balance."). The dialog turn may also comprise sending a request to a database and obtaining a response, in contrast to the system-user interaction.

Figure 2:
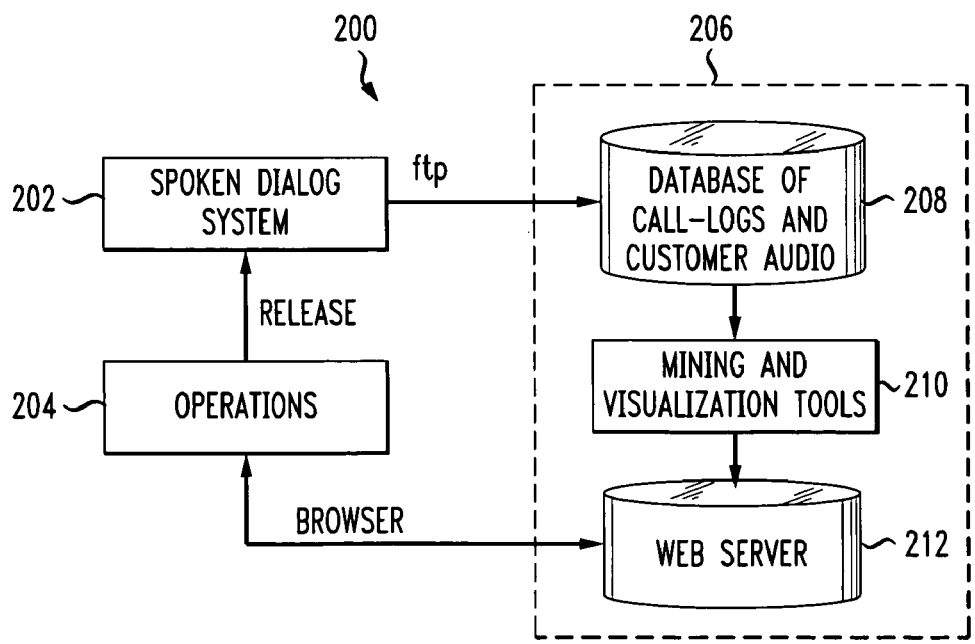
FIG. 2 illustrates a spoken dialog system with closed loop analysis tools.

Next is described a method and system for the processing and visualization of dialogs. In order to close the loop between a deployed system and its analysis, a regular data feed is required, with provision for the operations personnel (who are responsible for the system) to view the results. This is illustrated in FIG. 2. Dialog systems 202 are equipped with the ability to record key pieces of information to a call-log. What information is recorded varies greatly from application to application. There are challenges associated with key pieces of information missing from the call-log. In a preferred embodiment, a group of modules 206 process data from the spoken dialog system and present the data on a browser or other display device. One aspect of this process involves transmitting via ftp or other means the call-logs generated by the production system to a database 208 that organizes the call-logs and the customer audio. The analysis and visualization tools 210 mine the database and generate results that are viewable on a web server 212 through an interactive web tool that the operations personnel use to determine recommendations for changes to the system.

As can be appreciated, the physical location of the processing by modules 206 is irrelevant to the present invention. These modules may be combined into a single module or software program or be separated on different computing devices. The web server 212 may also represent an internal LAN server within a company so that the visualization of the dialog system may be kept internal and not available via the Internet.

The data from the web server 212 may be made available via a browser to an operations module 204 that enables a user or via an automatic process to provide an improved release of the spoken dialog system 202. This feedback, closed-loop system enables the continued improvement of the performance of the system 202 beyond what was previously possible.

Figure 3:
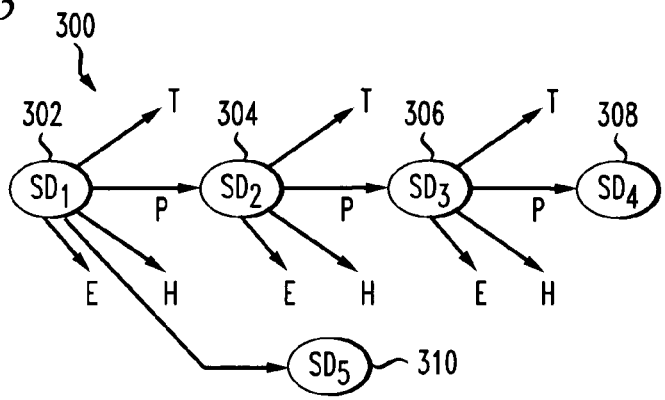
FIG. 3 illustrates finding sub-dialog hot spots.

Some systems require long dialogs with customers, extending over many turns, especially where the dialog is tightly directed. These are best partitioned into sub-dialogs using the call-flow as a guide. Each sub-dialog should end in exactly one of a plurality of possible ways. This is illustrated in FIG. 3, which shows as nodes 302, 304, 306, 208 and 310 sub-dialogs 1, 2, 3, 4 and 5 respectively. The following four endings to sub-dialogs are possible: proceed to next (P), transfer to agent or to another system (T), end-call by system (E), hang-up by caller (H). Not all of these may be implemented for all systems or sub-dialogs. The first three are determined by the call-flow, the last by the caller.

Sub-dialogs that have a relatively low rate of proceeding to the next sub-dialog are of concern. If there are a large number of transfers from a particular sub-dialog, the system should be able to zoom in and discover the precise reasons for this. Such hot-spots are good candidates for system improvements via changes to call-flow and models, implemented through system releases.

Consider the question of how to represent distributions of dialogs. The structure of a dialog (in general) is a sequence of sub-dialogs, each a sequence of turns, each a set of attributes with values. By projecting a sub-dialog onto a sequence of one of these attributes to form a dialog trajectory, the system or a user can sort, count, and view in a visual representation the dialog trajectory or other dialog data. An example of the dialog representation is a stochastic finite state machine (FSM). One aspect of the process is to project dialog data onto two attributes to obtain two interleaved sequences. As a result, these two-interleaved sequences can be represented on the nodes and arcs of the FSM.

Preferably, a node of the FSM would correspond with a unique state within the call-flow. If the logging is sufficiently comprehensive then this can be achieved with little or no manual intervention. In practice, call-logs are often incomplete, correspondence between call-flow and call-log is often implicit, and the outcome of the call (e.g., transfer to agent or another IVR, system end-call, user hang-up without completion, service completion) is not explicitly logged. The call-flow state and call-outcome must then be treated as hidden variables, and algorithms developed to infer these from observations. Therefore, part of the process of obtaining dialog trajectories is inferring if needed the interleaved sequences of two chosen attributes.

Figure 8:
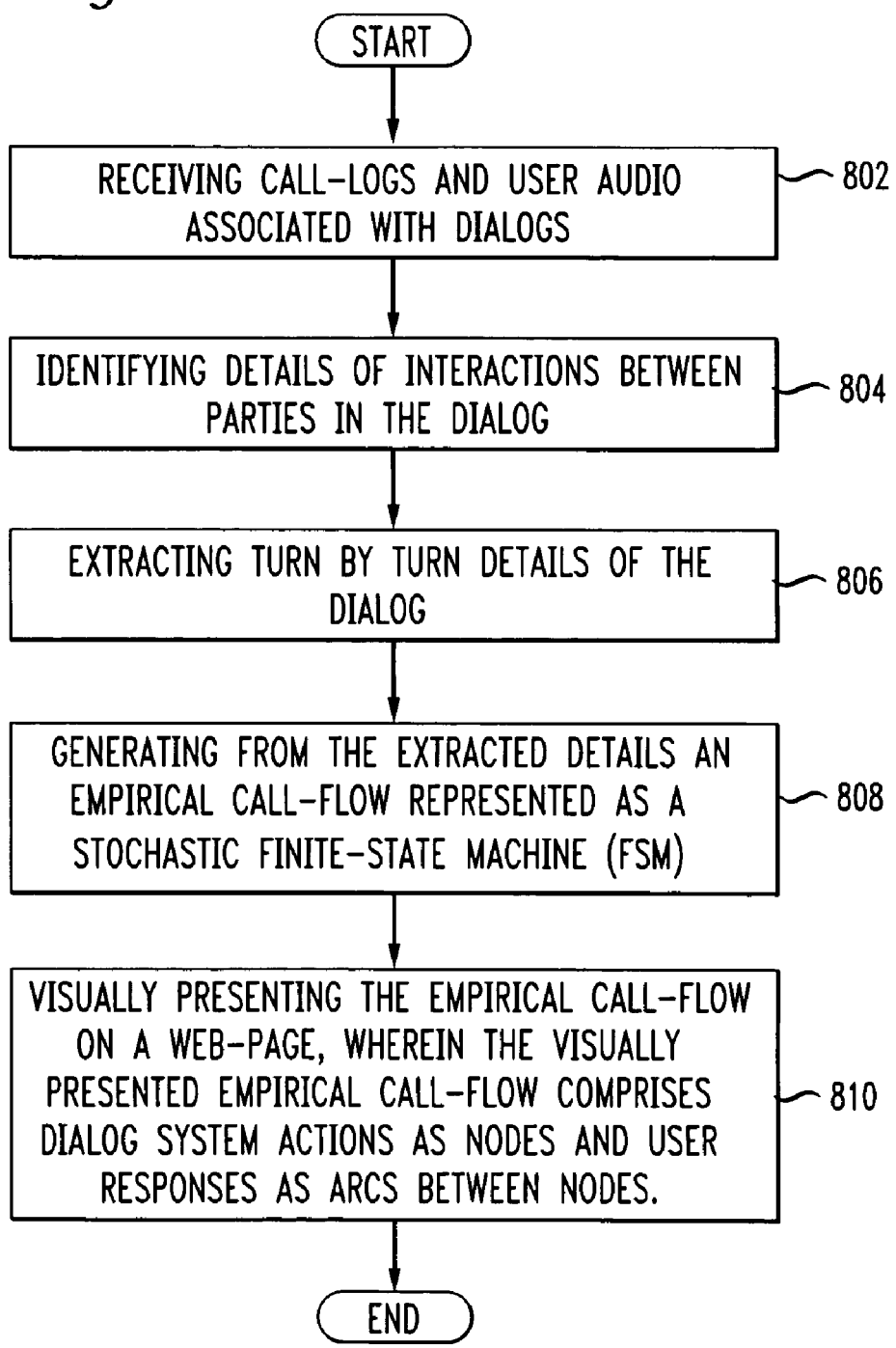
FIG. 8 illustrates a method embodiment of the invention.

Several method embodiments of the invention are introduced next. FIG. 8 introduces one method aspect of the invention. In this embodiment, the method comprises receiving call-logs and user audio associated with dialogs (802), identifying details of interactions between parties in the dialog (804), extracting turn by turn details of the dialog (806), generating from the extracted details an empirical call-flow represented as a stochastic finite-state machine (FSM) (808) and visually presenting the empirical call-flow on a web-page (810). The visually presented empirical call-flow may comprise dialog system actions as nodes and user responses as arcs between nodes.

Figure 9:
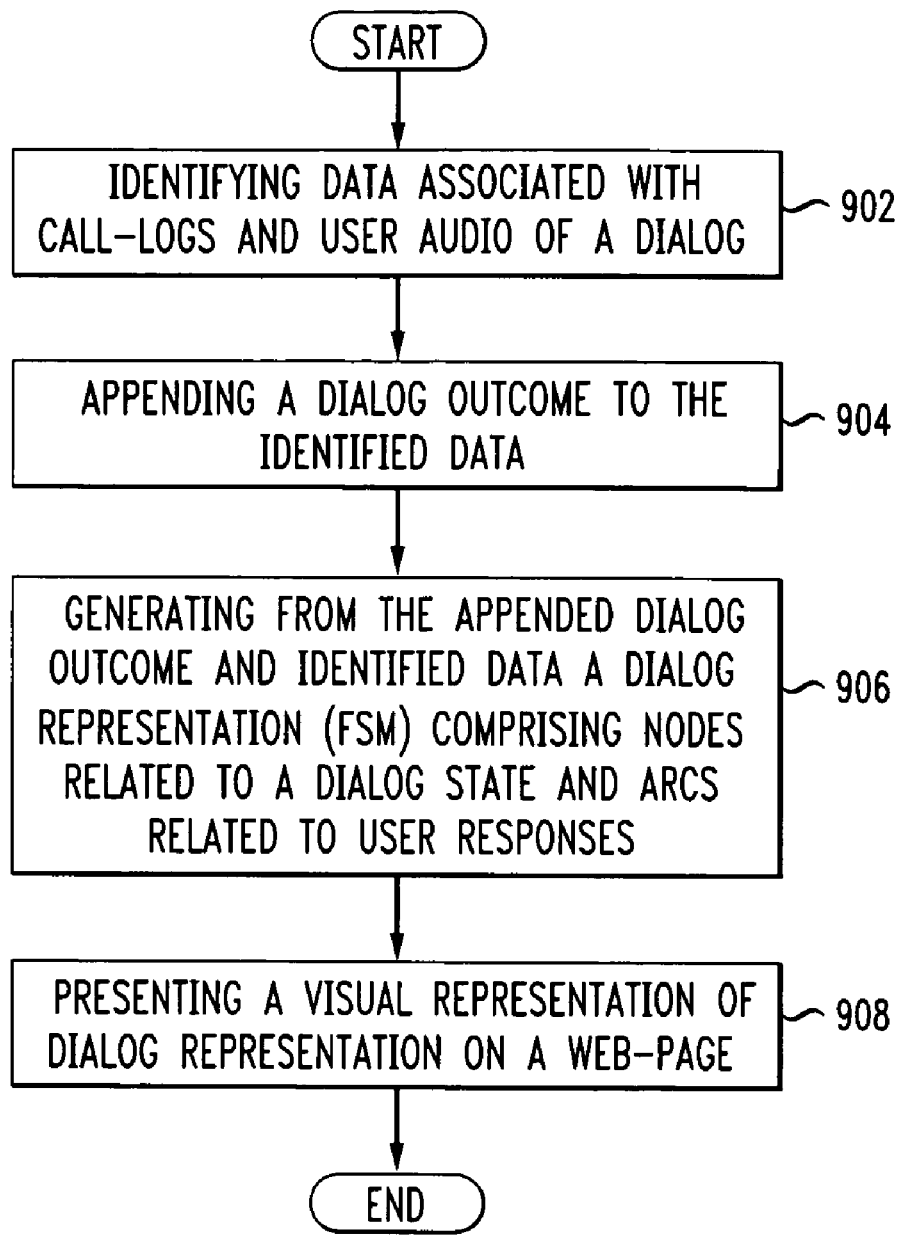
FIG. 9 illustrates another method embodiment of the invention.

FIG. 9 illustrates another method embodiment of the invention. As shown in FIG. 9, the method comprises identifying or extracting data directly from each call-log (if possible) or inferring (if needed) (902). The data may be, for example, interleaved sequences of two chosen attributes that characterize the system state and user response. Next, the method comprises appending an outcome (such as, e.g., transfer to agent or another IVR, system end-call, user hang-up without completion or service completion) (904). These first two steps are part of the process of completing or generating dialog trajectories. Next, the method comprises generating from the identified data and appended dialog outcomes (the dialog trajectories), a dialog representation (which can be an FSM) comprising nodes related to dialog state and arcs related to user responses (906), and presenting a visual representation of the dialog representation (908).

The FSM may be generated by sorting, counting, and converting the dialog trajectories into a minimized stochastic FSM, with the system state represented on the nodes and the user response on the arcs. The call outcomes may be encoded in the terminal nodes. For more information on FSMs within speech processing, see M. Mohri, F. C. Pereira and M. Riley, "Weighted finite-state transducers in speech recognition", *Computer Speech and Language,* 16(1):69-88, 2002, incorporated herein by reference.

Presenting a visual depiction of the FSM is preferably achieved by using a visualization package such as the Graphviz® package. See E. R. Gansner and S. C. North, "An open graph visualization system and its applications to software engineering", Software—Practice and Experience, 30(1): 1203-1233, 2000. As can be appreciated, no specific software visualization software is required to practice the invention. Those of skill in the art will understand the various tools that may be available.

The analysis may be done daily, weekly, monthly, or depending on need. Examples will be provided below. The behavior of a system is likely to change over time, as a result of system releases, user behavior and traffic routing into the system. Detecting and highlighting these changes requires two refinements. The first step is to detect the changes, and to focus on the independent sources of any change (consequent changes can be distracting). In one aspect, only changes relative to a chosen reference period are considered, rather than trends or cycles.

Because call outcomes are what is interesting, each sub-dialog terminal node F 408 is first tested (see FIG. 4) to find out whether P(F) has significantly increased or decreased. If so, we search among the arcs for contributory influences. There may be certain arcs that are causally significant with regards to terminal changes and therefore especially important to discover and understand. There may be several different ways to approach this discovery process. One example method is described next with reference to FIGS. 4, 5A and 5B. Arc a (from state S 402) is significant for terminal node F if:

P(a|S) has significantly changed in the same direction as F (increased or decreased), and P(F|S,a) is significantly greater than P(F|S,$\bar{a}$)

Figure 4:
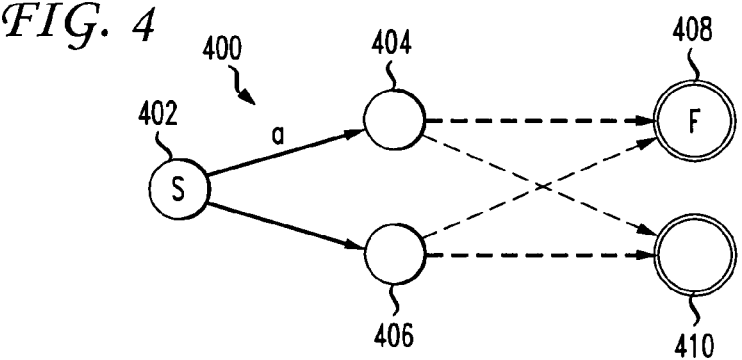
FIG. 4 illustrates a change detection within a sub-dialog.

All of these tests are done using 2×2 contingency tables, using exact methods for small counts and the standard chi-square approximation for large counts. These conditions ensure that an arc is significant for a terminal node because of a local change at state S 402, and not just because more trajectories are entering state S 402 as a result of other changes upstream. For display on the Internet, significant changes (arcs and nodes) may be represented in color. Other nodes 404, 406 and 410 are also shown in FIG. 4.

The sub-dialog trajectory FSMs can be quite large and it is useful to be able to compress them to make the significant changes more prominent. This is not the same as pruning, where arcs are deleted and nodes according to some criterion. Instead, sub-graphs containing no significant changes are compressed into a single arc represented by a dashed line.

Figure 5A:
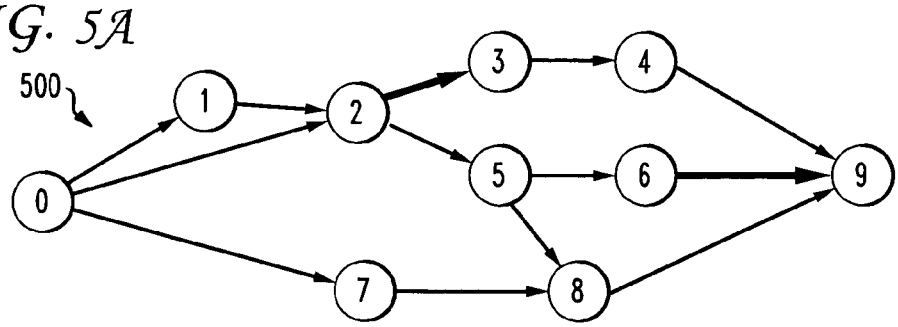
FIG. 5A illustrates an uncompressed finite-state machine.

FIG. 5A shows part of a sub-dialog FSM 500, containing two significant arcs 504, 506 (bold arrows). The first step is to label certain nodes as visible as follows:

Start and all terminal nodes

Nodes connected by significant arcs

Figure 5B:
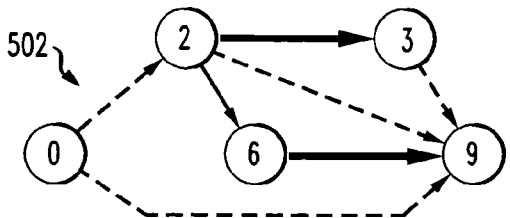
FIG. 5B illustrates a compressed finite-state machine.

Next, all significant arcs are labeled as visible. Finally, all trajectories that pass through significant arcs are traced through the FSM and dashed arcs are created to join the visible nodes (replacing one or more non-significant arcs). This restores connectivity to the graph. A trajectory count can be associated with a dashed arc by accumulating over the counts of trajectories that traverse it. FIG. 5B shows the result 502.

Figure 6:
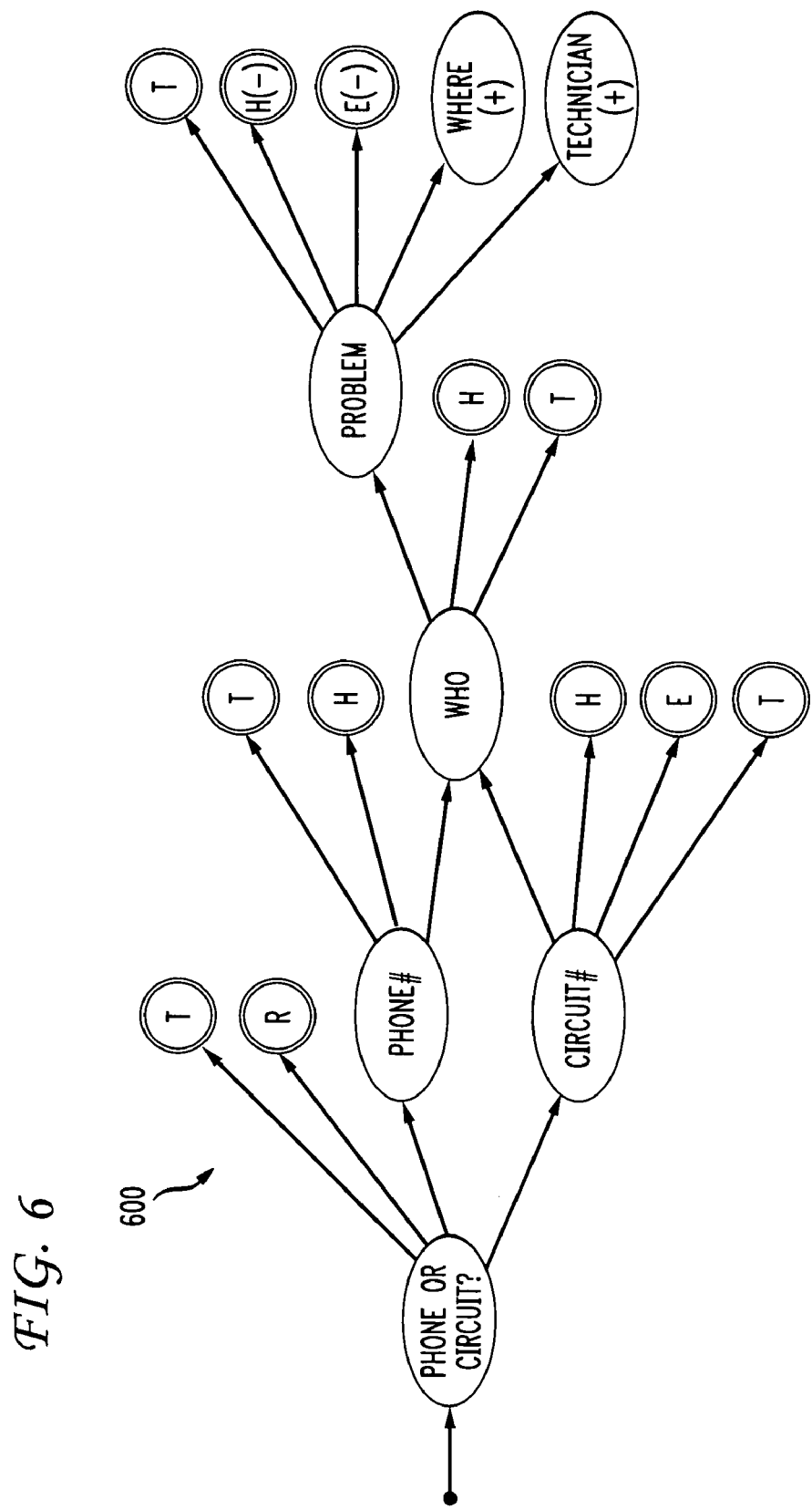
FIG. 6 illustrates a sub-dialog overview.
Figure 7:
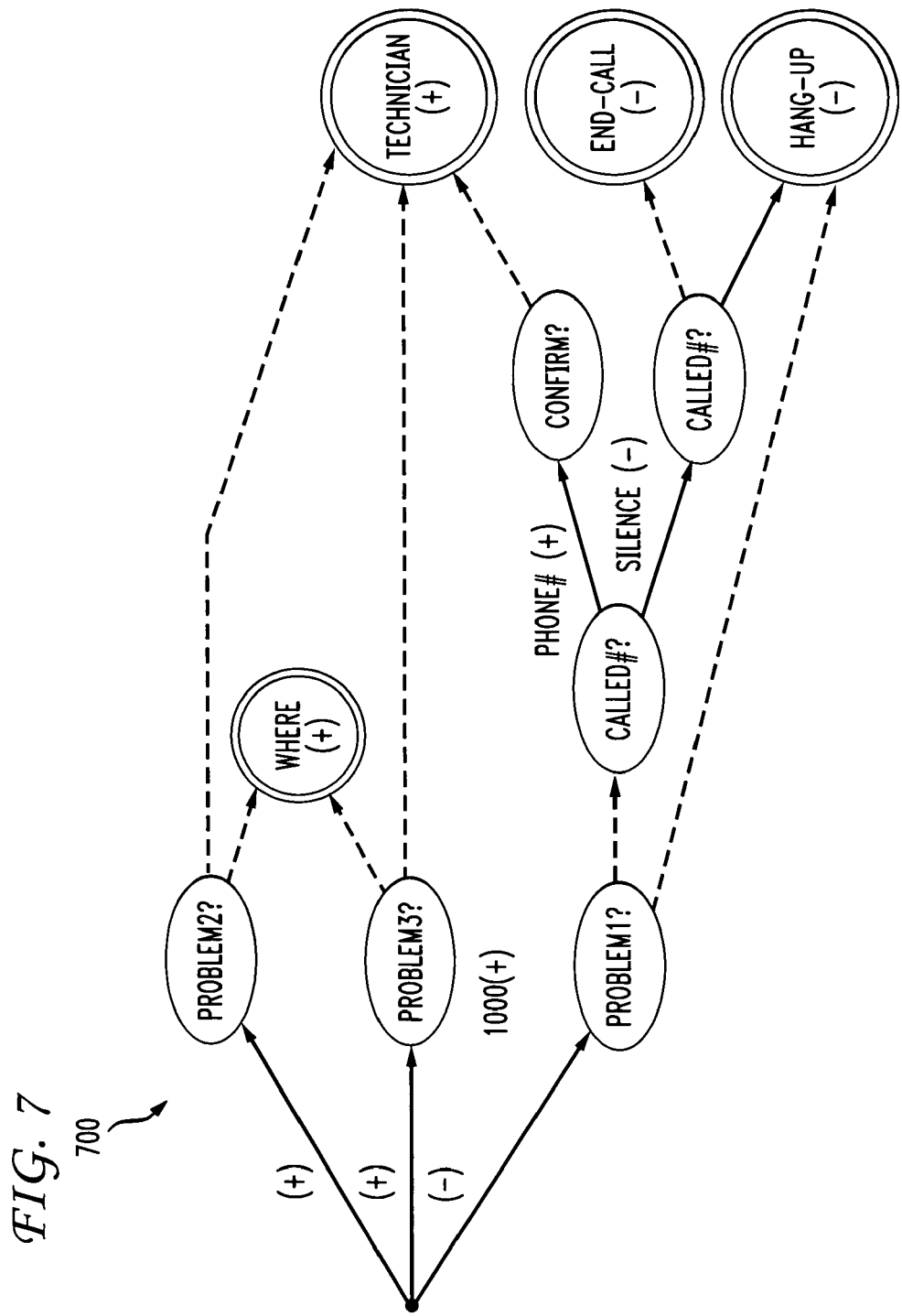
FIG. 7 illustrates a compressed sub-dialog.

An interactive web tool may be used to enable a person to view the results of the analysis. The web tool allows a user to view weekly (or whatever time frame) dialog trajectories. There are multiple views of the trajectories. While the web tool is a generalized tool, FIGS. 6 and 7 illustrate a particular trouble-ticket application to which the web tool may be applied. When a user selects a week they see an overview of the empirical call-flow for the entire application, as shown in FIG. 6. Each node on this graph preferably represents a sub-dialog. The web tool enables the user to click on the node and see the graph representing the sub-dialogs as shown in FIG. 7. The nodes on each sub-dialog graph represent the grammars that were active. Clicking on the grammar nodes reveals statistics about the grammar, including the numbers of rejections, recognitions and silences. The web tool may display all recognition results or the top n recognition results. In this regard, a user can receive detailed information on how the dialog system is performing at each step in the dialog, and how this is changing over time. This information becomes easily accessible to the human user or administrator responsible for upgrading the system. As can be appreciated, the interactive web tool and the process of how the user can obtain more information by clicking on nodes can work for any application including the exemplary application shown in FIGS. 6 and 7.

As an example web tool interface to the underlying analysis, each sub-dialog page may reveal, for example, two options to the user. If there has been a significant change from the reference to the current period then a button appears that enables the user to view only the portion of the graph that has changed significantly from the reference period. Also associated with each page is an option for an expanded view of the graph that displays the user utterances on the arcs. This describe provides a sample interface to the data. It is contemplated within the scope of the invention that there are a variety of buttons and options enabling the user to control various views of the data.

In the particular trouble-ticket application shown in FIG. 6, the application is a dialog system through which business customers having problems with telephone or data circuits can create trouble tickets. For this system, course-grained statistics are available that describe overall numbers of tickets created and fall-outs (such as transfers, hang-ups and end-calls before ticket creation) but with little indication of where and no explanation of why. A daily feed of call-logs is received for use by the trouble-ticket application. These call-logs contain turn information including a time stamp, prompt name, ASR grammar name, ASR status and result and call-intent classification (if applicable) as well as call-level information such as the calling number, date/time and call disposition. Where items of information may be lacking from a data feed, these hidden variables may be inferred from known sequences of events within each call-log using the call-flow specification as a guide. Less information is found in the data feed may require more manual intervention. According, the more information that can be obtained from call-logs, the less manual intervention is necessary.

FIG. 6 shows a sub-dialog overview plot which is a more specific example of the general version shown in FIG. 3. This overview plot and detailed plots for all the sub-dialogs are generated automatically from the call-logs received each day. Seven example sub-dialogs are may be used for this example trouble-ticket application:

Phone or Circuit?: Determine whether problem is with a phone or a data circuit.
Phone#: Get and confirm the trouble phone number.
Circuit#: Get and confirm the trouble circuit number.
Who?: Get contact information.
Problem?: Get details of the problem.
Where?: Get location information.
Technician?: Get authorization for a site visit.

FIG. 6 illustrates where a proportion of calls increases or decreases as represented by the + in the Where node and a + in the Technician node. The proportion of calls reaching these nodes in the sub-dialog has significantly increased compared with a reference period and the proportion of end-calls for this sub-dialog has decreased indicated by the minus sign in the end-call node "E(−)".

To understand this in greater detail, FIG. 7 illustrates the trajectory plot for this sub-dialog. The Where? sub-dialog is treated as a terminal node for this sub-dialog. The full plot actually contains more than 17,000 arcs, so a compression procedure discussed above was used to highlight the arcs that significantly influence the terminal nodes. Hang-ups are not displayed because they have not significantly changed. Note two changes that explain the observed shift. First at the start node, fewer calls are routed through the Problem1? question, with a greater number being routed through two alternatives. This reflects a call-flow change. Second, in eliciting a Called# a greater proportion of users are providing a valid 10-digit number, with a smaller proportion unsure. Together these explain the significant changes in the end-call and Where? terminal nodes.

The present invention provides a new procedure for visualization of dialog trajectories, with the ability to zoom in to pinpoint hot spots. Machine and customer channels are represented on the nodes and arcs of an FSM. Novel graph algorithms are introduced for inferring hidden variables, change detection, and subgraph compression. The empirical call-flow lays out the actual user's path through the call flow. It is generated for many users over many interactions thus creating a representation of the system behavior.

Figure 10:
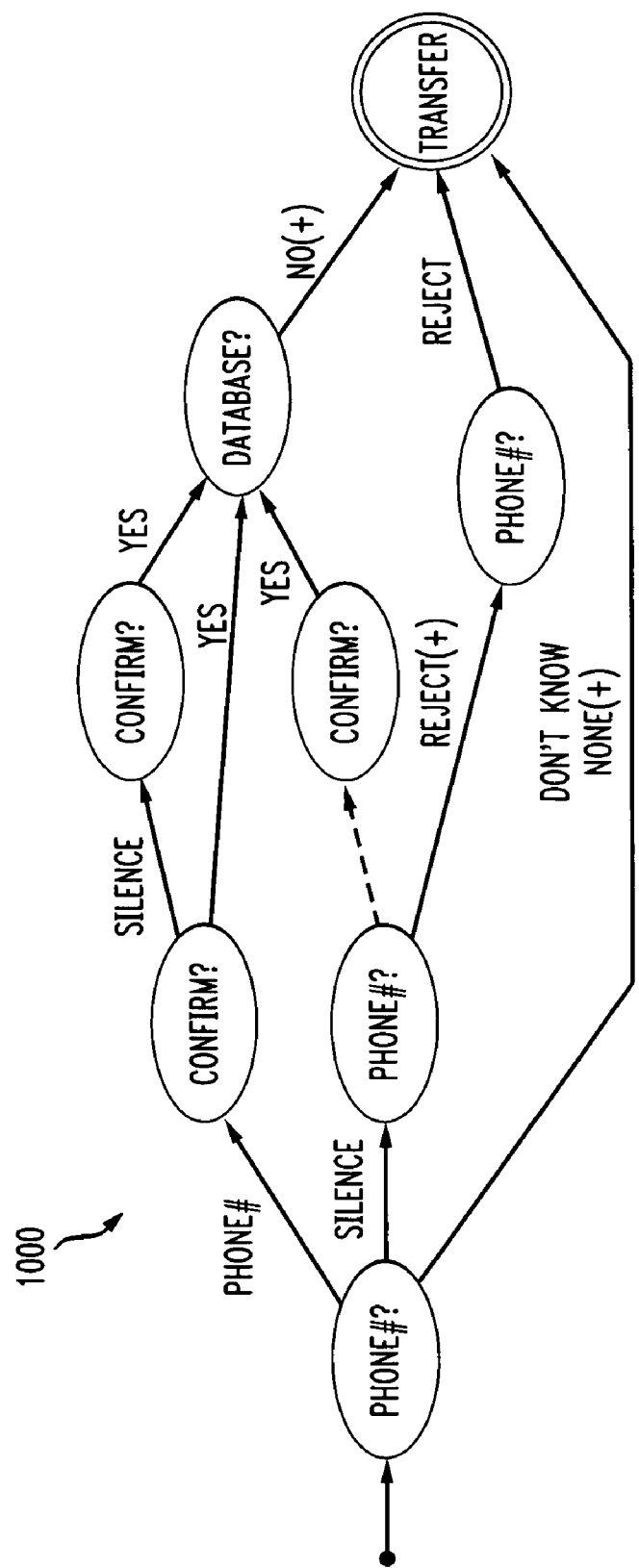
FIG. 10 illustrates an example sub-dialog identifying significant causes of transfers.

FIG. 10 illustrates a phone# sub-dialog 1000 showing significant causes of transfers. This figure illustrates, instead of comparison over time, a comparison over call disposition and how to identify significant causes of fall-outs within sub-dialogs. There are other "why?" questions that can be asked, for example, "why are users transferred in the 'Phone#' sub-dialog?". To answer this, the dialogs that get transferred from this sub-dialog are compared with those that process to next. FIG. 10 shows that there are three significant causes: (1) persistent silence or rejection; (2) the user does not know the number; and (3) the number is not found in the database. Moreover, these can be ranked in an order of importance which is helpful when considering how to reduce the number of unnecessary transfers out of the sub-dialog.

Figure 11:
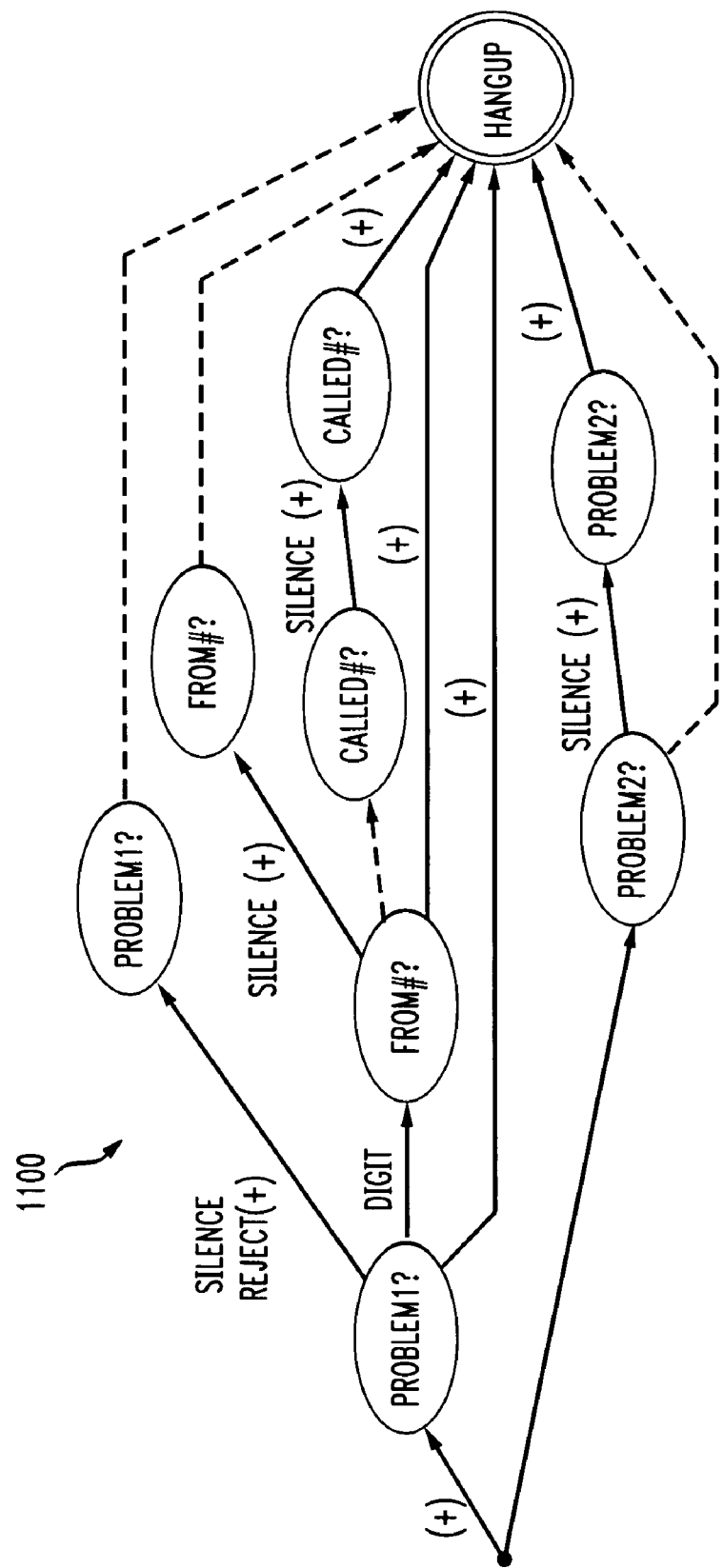
FIG. 11 shows an example problem sub-dialog identifying significant locations of hang-ups.

The question "why do users hang-up?" cannot be directly answered because this is not determined by the system. However, the system can answer the corresponding "where?" question for a sub-dialog by comparing the dialogs that hang-up with those that proceed. FIG. 11 shows that there are significant clusters of hang-ups with the 'Problem' sub-dialog 1100 where users are unable or unwilling to answer particular questions and remain silent. This can indicate that certain prompts may be confusing or that users do not have the information available at that time.

The invention provides for a new procedure for visualization of human-machine dialogs using FSMs to represent machine actions on the nodes and user responses on the arcs. Call dispositions are represented as final nodes of the FSM. If a dialog system is complex it can be partitioned into sub-dialogs, each with its own FSM and an additional overview FSM is created to show the interconnectivity of the sub-dialogs and call dispositions. The FSMs are rendered graphically on an interactive web server which allows the user to see both a high-level view of the system and to zoom in to see fine details.

Change detection and sub-graph compression procedures are used to compare and make prominent the causal explanations behind changes in distribution over call dispositions for two periods of time. This is especially valuable for alerting the system operators to unexpected deviations in system behavior and for comparing system performance across releases. When the same procedures are used to compare sets of dialogs with different dispositions, they help to provide diagnostic explanations for premature fall-outs. Such insights, backed up by quantitative evidence from large numbers of calls are invaluable for planning and implementing system improvements that substantially benefit users.

The utility of these approaches are clear for the specific trouble-ticket application. These approaches apply to other applications and conducting user interface studies with personal in operations teams can ensure that the tools are optimized for their particular needs and application.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, while the process above is disclosed in terms of user to dialog system dialogs, the analysis could also occur on human/human dialogs. There are applications to human/human dialogs in multilingual contexts where translations may be improved based on dialog hotspots or other feedback on where to improve translation. In this regard, the basic approach may be used to improve dialog requirements or dialog flow used by a human agent when interacting with a customer or user.

In addition to the multi-lingual context there is also the context of analyzing human/human dialogs when first building automated dialog systems. There have been numerous applications of spoken dialog systems that have been built from scratch in the sense that there has not been an existing IVR system to work from. Instead, the only previous user communications are with a human agent. Understanding the human/human dialogs helps in building a spoken dialog system when an IVR system does not exist. Accordingly, the appended claims and their legal equivalents should only define the invention, rather than any specific examples given.

We claim:

1. A method of analyzing dialogs, the method comprising:
   receiving, via a processor, call-logs associated with a plurality of dialogs between a dialog system and users and external information about at least one user;
   extracting a first portion of turn-by-turn details of dialogs from the call-logs comprising at least a time stamp associated with a turn in the plurality of dialogs;
   inferring a second portion of the turn-by-turn details unavailable in the call-logs based on the first portion of the turn-by-turn details using a call-flow specification as a guide, the second portion of the turn-by-turn details comprising an interleaved sequence of at least two attributes that characterize a system state and a user response; and
   generating, from the first portion of the turn-by-turn details, the external information about the user, and the second portion of the turn-by-turn details, an empirical call-flow representation of the dialog.

2. The method of claim 1, further comprising identifying details of interactions between the dialog system and the person.

3. The method of claim 1, further comprising visually presenting the empirical call-flow.

4. The method of claim 3, wherein visually presenting the empirical call-flow further comprises presenting the call-flow on an interactive web-page.

5. The method of claim 3, wherein the visually presented empirical call-flow comprises dialog system actions as nodes and user responses as arcs between nodes.

6. The method of claim 1, wherein the data associated with the plurality of dialogs further comprises call audio.

7. The method of claim 1, wherein the plurality of dialogs is a human to human dialog.

8. The method of claim 1, wherein the plurality of dialogs is between a human and an automated dialog system.

9. The method of claim 1, wherein the empirical call-flow representation of the dialog is a stochastic finite-state machine.

10. The method of claim 1, wherein extracting the first portion of the turn-by-turn details of the plurality of dialogs further comprises partitioning the plurality of dialogs into two plurality of sub-dialogs.

11. The method of claim 10, wherein each at least one sub-dialog ends in one of the following ways: proceed to next dialog, transfer to agent or another system, end call by system or hang-up by caller.

12. The method of claim 10, further comprising identifying a hot-spot associated with a particular sub-dialog.

13. The method of claim 12, wherein the empirical call-flow representation of the plurality of dialogs emphases the identified hot-spot.

14. The method of claim 10, further comprising:
   detecting changes in dialog behavior at a sub-dialog terminal node; and
   if changes are detected, searching among arcs associated with the call-flow representation of the dialog for an influence for the detected change.

15. The method of claim 1, further comprising:
   compressing the empirical call-flow representation of the plurality of dialogs.

16. The method of claim 15, wherein compressing the empirical call-flow representation of the plurality of dialogs further comprises compressing sub-graphs within the empirical call-flow representation that contain no significant detected changes into a single arc between nodes.

17. A method of generating a visual representation of a plurality of dialogs, the method comprising:
   identifying, via a processor, data associated with the plurality of dialogs between a dialog system and users and external information at least one user retrieved from a database, the data comprising call-logs for the plurality of dialogs identifying a first portion of turn-by-turn details of the plurality of dialogs;
   appending a dialog outcome to the data, the dialog outcome received in a data feed of the call logs;
   inferring a second portion of the turn-by-turn details of the plurality of dialogs unavailable from the call-logs based on the plurality of dialogs outcome using a call-flow specification as a guide, the second portion of the turn-by-turn details comprising an interleaved sequence of at least two attributes that characterize a system state and a user response; and
   generating from the appended dialog outcome, identified data, the second portion of the turn-by-turn details, and the external information about the user, a dialog representation comprising nodes related to a dialog state and arcs related to user responses.

18. The method of claim 17, wherein identifying data further comprises either extracting directly from call-logs or inferring interleaved sequences of a plurality of chosen attributes that characterize a dialog system state and a user response.

19. The method of claim 17, wherein the outcome is one of: transfer to agent, transfer to a spoken dialog system, system end-call, user hang-up without completion or service completion.

20. The method of claim 17, wherein the identified data and appended outcomes comprise a dialog trajectory.

21. The method of claim 20, wherein generating the dialog representation further comprises sorting, counting, and converting the dialog trajectory into a minimized stochastic finite state machine.

22. The method of claim 21, wherein outcomes are encoded in terminal nodes of the finite state machine.

23. The method of claim 17, further comprising presenting a visual representation of dialog representation.

24. The method of claim 23, wherein the visual representation is presented on a web-based display client.

25. A system for analyzing dialogs, the system comprising:
   a processor;
   means for controlling the processor to receive data associated with a plurality of dialogs between a dialog system and users and external information about at least one user retrieved from a database, the data comprising call-logs for the plurality of dialogs;
   means for controlling the processor to extract a first portion of turn-by-turn details of the plurality of dialogs from a data feed of the call-logs comprising at least a time stamp associated with a turn in the plurality of dialogs;
   means for controlling the processor to infer a second portion of the turn-by-turn details unavailable in the call-logs based on the first portion of the turn-by-turn details using a call-flow specification as a guide, the second portion of the turn-by-turn details comprising an interleaved sequence of at least two attributes that characterize a system state and a user response, the call-flow specification describing actions that should be performed based on user input; and
   means for controlling the processor to generate from the first portion of the turn-by-turn details, the external information about the user, and the second portion of the turn-by-turn details an empirical call-flow representation of the plurality of dialogs.

26. The system of claim 25, further comprising means for controlling the processor to visually present the empirical call-flow representation.

27. A system for analyzing dialogs, the system comprising:
   a processor;
   a first module configured to control the processor to receive call-logs associated with a plurality of dialogs between a dialog system and users and external information about at least one user;
   a second module configured to control the processor to extract a first portion of turn-by-turn details of dialogs from of the call-logs comprising at least a time stamp associated with a in the plurality of dialogs;
   a third module configured to control the processing to infer a second portion of the turn-by-turn details unavailable in the call-logs based on the first portion of the turn-by-turn details using a call-flow specification as a guide, the second portion of the turn-by-turn details comprising an interleaved sequence of at least two attributes that characterize a system state and a user response; and
   a fourth module configured to control the processor to generate, from the first portion of the turn-by-turn details, the external information about at least one user, and the second portion of the turn-by-turn details an empirical call-flow representation of the plurality of dialogs.

28. The system of claim 27, further comprising a fifth module configured to control the processor to visually present the empirical call-flow representation.

29. A non-transitory computer-readable medium storing instructions for controlling a computing device to analyze dialogs, the instructions comprising:
   receiving call-logs associated with a plurality of dialogs between a dialog system and users and external information about at least one user;
   extracting a first portion of turn-by-turn details of dialogs from the call-logs comprising at least a time stamp associated with a turn in the plurality of dialogs;
   inferring a second portion of the turn-by-turn details unavailable in the call-logs based on the first portion of the turn-by-turn details using a call-flow specification as a guide, the second portion of the turn-by-turn details comprising an interleaved sequence of at least two attributes that characterize a system state and a user response; and
   generating, from the first portion of the turn-by-turn details, the external information about the at least one user, and the second portion of the turn-by-turn details an empirical call-flow representation of the plurality of dialogs.

30. A non-transitory computer-readable medium storing instructions for controlling a computing device to analyze dialogs, the instructions comprising:
 identifying data associated with a plurality of dialogs between a dialog system and users and external information about at least one user retrieved from a database;
 appending a dialog outcome to the data, the dialog outcome received in a data feed of call logs;
 inferring a second portion of the turn-by-turn details of the dialog unavailable from the call-logs based on the dialog outcome using a call-flow specification as a guide, the second portion of the turn-by-turn details comprising an interleaved sequence of at least two attributes that characterize a system state and a user response; and
 generating from the dialog outcome, identified data, the second portion of the turn-by-turn details, and the external information about the user, a dialog representation comprising nodes related to a dialog state and arcs related to user responses.

\* \* \* \* \*